3,030,424
CYCLOALKENYL SULFONES
Edward M. La Combe, Charleston, and Byron Stewart, South Charleston, W. Va., assignors to Union Carbide Corporation, a corporation of New York
No Drawing. Filed Mar. 31, 1960, Ser. No. 18,858
6 Claims. (Cl. 260—607)

This invention is directed to a new class of sulfones and has for an object the provision of a novel class of cyloalkenyl sulfones selected from the class consisting of cyclohexenyl sulfones represented by the general formula:

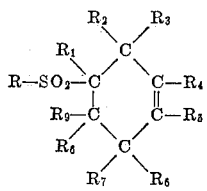

and bicycloheptenyl sulfones represented by the general formula:

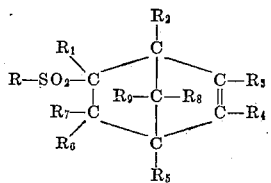

wherein R represents a group selected from the class consisting of alkenyl, cycloalkenyl and bicycloalkenyl radicals, said radicals substituted with members selected from the group of hydrogen, halogen, lower alkyl and lower alkenyl groups, and $R_1$ through $R_9$ represents members selected from the group consisting of hydrogen, halogen-lower alkenyl, and lower alkyl groups, the total number of carbon atoms in $R_1$ through $R_9$ does not exceed 12 carbon atoms.

The compounds of this invention are useful as plasticizers for vinyl halide resins. Furthermore, the compounds of this invention are useful as intermediates in the preparation of other new chemical compounds by virtue of the available double bonds. Additionally, the new compounds are useful intermediates in the preparation of biological preparations.

In preparing the cyloalkenyl sulfones of this invention, the reaction is effected by reacting a conjugated alkadiene and a divinyl sulfone, and homologues thereof in the presence of a polymerization inhibitor, according to the general Diels-Alder procedure at temperatures ranging from about 25° C. or lower to about 160° C. or higher. The reaction may be carried out either with or without solvent depending on whether the product is liquid or solid and the state in which it is to be obtained. Typical solvents which may be employed in this reaction are benzene, ethanol, saturated aliphatic hydrocarbons, and the like. Any suitable commercial polymerization inhibitor may be used in the reaction without impairing the efficiency of it. The reaction may be effected at atmospheric, sub-atmospheric or superatmospheric pressure depending on the solvents and reactants employed and the temperatures used.

The bis(cyclohexenyl) sulfones of this invention can be readily prepared by adding the desired diene such as butadiene to a dienophile such as divinyl sulfone, in a pressure vessel. To these reactants is added a suitable amount of inhibitor such as sulfuryl chloride, beta-naphthyl-phenylamine, hydroquinone and the like. The mixture is heated in the temperature range of about 120° C. to about 160° C. for about 3 to about 8 hours under superatmospheric pressures. During the reaction, the pressure of the reaction system will decrease and when the pressure ceases to decrease, the reaction is then complete. After heating for a desired period of time, the product is removed from the reaction vessel and purified by recrystallization from a suitable solvent such as methanol. The resulting products can be isolated by distillation as well as by recrystallization. When more reactive dienes are used, the reaction may be run in conventional laboratory equipment using benzene or other suitable solvents at room temperature or slightly above and at atmospheric pressures.

The bicycloalkenyl sulfones of this invention can be readily prepared by adding the desired diene such as cyclopentadiene to a dienophile such as divinyl sulfone contained in an inert organic solvent such as benzene in a suitable reaction flask under atmospheric conditions. To these reactants is added a suitable inhibitor such as hydroquinone. During the addition of the cyclopentadiene, the reactants are exothermic and the temperature range of about 40° C. to about 80° C. are maintained by heating or cooling as the case may require. After the cyclopentadiene has been added, the addition temperatures can be maintained, increased or decreased as the reaction may require for completion. The resulting product can be isolated by distillation under reduced pressures or by recrystallization as the case may warrant.

The dienes used as starting materials for the production of the sulfones falling within the scope of this invention are prepared by known procedures. Divinyl sulfone is prepared according to the procedure described in U.S. Patent 2,801,267.

Among the dienophiles which can be employed with success to prepare the compounds of this invention are divinyl sulfone, bis(1-propenyl)-sulfone, bis(1-butenyl)-sulfone, bis(1-hexenyl)sulfone, bis(1-dodecenyl)sulfone, bis(1-tetradecenyl)sulfone, and the like.

Typical of the dienes used to prepare the compounds of this invention include 1,3-butadiene; 1,3-pentadiene; 1,3-hexadiene; 1,3-heptadiene; 1,3-octadiene; 1,3-nonadiene; 2,4-hexadiene; 2,4-heptadiene; 2,4-octadiene; 2,4-nonadiene; 2-methyl-1,3-butadiene; 2-ethyl-1,3-butadiene; 2,3-dimethylbutadiene; 2-methyl-1,3-pentadiene; 3-methyl-1-3-pentadiene; 2-ethyl-1,3-hexadiene; 2,3-dimethyl-1,3-pentadiene; 2,3-dimethyl-1,3-hexadiene; 2,3-dimethyl-1,3-heptadiene; 2,3-dimethyl-1,3-nonadiene; 2,3-dimethylcyclopentadiene; hexachlorocyclopentadiene; hexabromocyclopentadiene; 2-chlorocyclopentadiene; 1,5-dichlorocyclopentadiene; 2-methylcyclopentadiene; 2-hexylcyclopentadiene; 2-bromocyclopentadiene; 1,5-dibromocyclopentadiene; 1-chloro-1,3-butadiene; 2-chloro-1,3-butadiene; 1-chloro-3-methyl-1,3-pentadiene; 1-chloro-1,3-hexadiene; 1-chloro-1,3-nonadiene; 1-bromo-1,3-decadiene; 1,3,5-hexatriene; 1,3,5-heptatriene; 1,3,5-octatriene; 1,3,5-decatriene; 7-methyl-3-methylene-1,6-octadiene; 2-(3-butenyl)cyclopentadiene; 3-(4-hexenyl)cyclopentadiene; 2-allylcyclopentadiene, fulvene; and the like.

One embodiment of this invention is directed to a novel and useful subclass of alkenyl cycloalkenyl sulfones selected from the class consisting of alkenyl cyclohexenyl sulfones represented by the general formula:

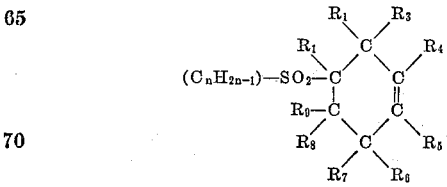

and alkenyl bicycloalkenyl sulfones represented by the general formula:

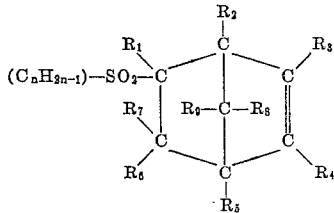

wherein the group ($C_nH_{2n-1}$) represents an alkenyl group containing from 2 to 18 carbon atoms and composed of carbon and hydrogen and containing one olefinic bond, and $R_1$ through $R_9$ represent members selected from the group consisting of hydrogen, halogen, lower alkyl and lower alkenyl groups, the total number of carbon atoms in $R_1$ through $R_9$ does not exceed 12 carbon atoms.

Illustrative of the alkenyl cycloalkenyl sulfones falling within this subclass, there may be mentioned inter alia: vinyl 3-cyclohexenyl sulfone; allyl 3-cyclohexenyl sulfone; 3-butenyl 3-cyclohexenyl sulfone; 4-pentenyl 3-cyclohexenyl sulfone; 7-octenyl 3-cyclohexenyl sulfone; 9-decenyl 3-cyclohexenyl sulfone; 17-octadecenyl 3-cyclohexenyl sulfone; vinyl methyl-3-cyclohexenyl sulfone; allyl propyl-3-hexenyl sulfone; 3-butenyl hexyl-3-cyclohexenyl sulfone; 6-heptenyl 3-cyclohexenyl sulfone; 9-decenyl octyl-3-cyclohexenyl sulfone; vinyl 5-methyl-3-cyclohexenyl sulfone; allyl 6-propyl-3-cyclohexenyl sulfone; 3-butenyl 3-hexyl-3-cyclohexenyl sulfone; vinyl 5-chloro-3-cyclohexenyl sulfone; vinyl 5-bromo-3-cyclohexenyl sulfone; allyl 6-chloro-3-cyclohexenyl sulfone; allyl 6-bromo-3-cyclohexenyl sulfone; 3-butenyl 5,6-dichloro-3-cyclohexenyl sulfone; 3-butenyl 5,6-dibromo-3-cyclohexenyl sulfone; vinyl bicyclo[2,2,1]-5-hepten-2-yl sulfone; allyl bicyclo[2.2.1]-5-hepten-2-yl sulfone; 3-butenyl bicyclo[2.2.1]-5-hepten-2-yl sulfone; 4-pentenyl bicyclo-[2.2.1]-5-hepten-2-yl sulfone; 7-octenyl bicyclo[2.2.1]-5-hepten-2-yl sulfone; 17-octadecenyl bicyclo[2.2.1]-5-hepten-2-yl sulfone; allyl 3-hexylbicyclo[2.2.1]-5-hepten-2-yl sulfone; allyl 3-propylbicyclo[2.2.1]-5-hepten-2-yl sulfone; vinyl 1-chlorobicyclo[2.2.1]-5-hepten-2-yl sulfone; vinyl 1-bromobicyclo[2.2.1]-5-hepten-2-yl sulfone; allyl 4-chlorobicyclo[2.2.1]-5-hepten-2-yl sulfone; allyl 4-bromobicyclo[2.2.1]-5-hepten-2-yl sulfone; 5-hexenyl 1,4,5,6,7,7-hexachlorobicyclo[2.2.1]-5-hepten-2-yl sulfone; 3-butenyl 4-(4-methyl-3-pentenyl)-3-cyclohexenyl sulfone; allyl 3-vinyl-3-cyclohexenyl sulfone; 3-butenyl 3-allyl-3-cyclohexenyl sulfone; 5-hexenyl 4-(3-hexenyl)-3-cyclohexenyl sulfone; and the like.

Another embodiment of this invention is directed to a novel and useful subclass of cycloalkenyl sulfones selected from the class consisting of bis(cyclohexenyl) sulfones represented by the formula:

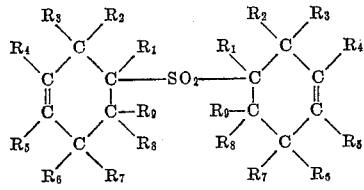

and bicycloheptenyl cyclohexenyl sulfones represented by the general formula:

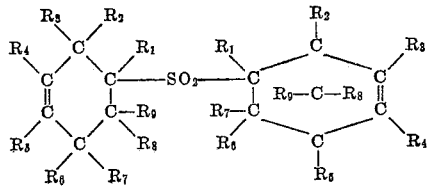

$R_1$ through $R_9$ represent members selected from the group consisting of hydrogen, halogen, lower alkyl and lower alkenyl groups, the total number of carbon atoms in $R_1$ through $R_9$ does not exceed 12 carbon atoms.

Illustrative of the cycloalkenyl sulfones included within this subclass, there may be mentioned inter alia: bis(3-cyclohexenyl) sulfone; bis(3-methyl-3-cyclohexenyl) sulfone; bis(3-ethyl-3-cyclohexenyl) sulfone; bis(3-propyl-3-cyclohexenyl) sulfone; bis(3-butyl-3-cyclohexenyl) sulfone; bis(3-amyl-3-cyclohexenyl) sulfone; bis(6-methyl-3-cyclohexenyl) sulfone; bis(6-hexyl-3-cyclohexenyl) sulfone; bis(3,6-dimethyl-3-cyclohexenyl) sulfone; bis(6-methyl-3-ethyl-3-cyclohexenyl) sulfone; bis(6-methyl-3-propyl-3-cyclohexenyl) sulfone; bis(6-methyl-3-butyl-3-cyclohexenyl) sulfone; bis(5-methyl-3-cyclohexenyl) sulfone; bis(4-methyl-3-cyclohexenyl) sulfone; bis(5-ethyl-3-cyclohexenyl) sulfone; bis(4-ethyl-3-cyclohexenyl) sulfone; bis (4,5-dimethyl-3-cyclohexenyl) sulfone; bis(3,5-dimethyl-3-cyclohexenyl) sulfone; bis(3,4-dimethyl-3-cyclohexenyl) sulfone; bis(3,5-diethyl-3-cyclohexenyl) sulfone; bis(3,4-diethyl-3-cyclohexenyl) sulfone; bis(3,4,5-trimethyl-3-cyclohexenyl) sulfone; bis(4,5-dimethyl-3-ethyl-3-cyclohexenyl) sulfone; bis(4,5-dimethyl-3-propyl-3-cyclohexenyl) sulfone; bis(4,5-dimethyl-3-amyl-3-cyclohexenyl) sulfone; 3-cyclohexenyl bicyclo[2.2.1]-5-hepten-2-yl sulfone; 3-methyl-3-cyclohexenyl bicyclo[2.2.1]-5-hepten-2-yl sulfone; 3-ethyl-3-cyclohexenyl bicyclo[2.2.1]-5-hepten-2-yl sulfone; 3-propyl-3-cyclohexenyl bicyclo[2.2.1]-5-hepten-2-yl sulfone; 3-butyl-3-cyclohexenyl bicyclo[2.2.1]-5-hepten-2-yl sulfone; 3-amyl-3-cyclohexenyl bicyclo[2.2.1]-5-hepten-2-yl sulfone; 6-methyl-3-cyclohexenyl bicyclo[2.2.1]-5-hepten-2-yl sulfone; 6-hexyl-3-cyclohexenyl bicyclo[2.2.1]-5-hepten-2-yl sulfone; 3,6-dimethyl-3-cyclohexenyl bicyclo[2.2.1]-5-hepten-2-yl sulfone; 6-methyl-3-ethyl-3-cyclohexenyl bicyclo[2.2.1]-5-hepten-2-yl sulfone; 6-methyl-3-propyl-3-cyclohexenyl bicyclo[2.2.1]-5-hepten-2-yl sulfone; 6-methyl-3-butyl-3-cyclohexenyl bicyclo[2.2.1]-5-hepten-2-yl sulfone; 5-methyl-3-cyclohexenyl bicyclo[2.2.1]-5-hepten-2-yl sulfone; 4-methyl-3-cyclohexenyl bicyclo[2.2.1]-5-hepten-2-yl sulfone; 5-ethyl-3-cyclohexenyl bicyclo[2.2.1]-5-hepten-2-yl sulfone; 4-ethyl-3-cyclohexenyl bicyclo[2.2.1]-5-hepten-2-yl sulfone; 4,5-dimethyl-3-cyclohexenyl bicyclo-[2.2.1]-5-hepten-2-yl sulfone; 3,5-dimethyl-3-cyclohexenyl bicyclo[2.2.1]-5-hepten-2-yl methyl sulfone; 4,5-dimethyl-3-propyl-3-cyclohexenyl 1-chlorobicyclo[2.2.1]-5-hepten-2-yl sulfone; 4,5-dimethyl-3-amyl-3-cyclohexenyl 1-bromobicyclo[2.2.1]-5-hepten-2-yl sulfone; 3,5-dimethyl-3-cyclohexenyl 4-chlorobicyclo[2.2.1]-5-hepten-2-yl sulfone; 3,4-dimethyl-3-cyclohexenyl 4-bromobicyclo[2.2.1]-5-hepten-2-yl sulfone; 3,5-diethyl-3-cyclohexenyl 1,4,5,6,7,7-hexachlorobicyclo[2.2.1] - 5 - hepten-2-yl sulfone; bis[3-(4-methyl-3-pentenyl)-3-cyclohexenyl] sulfone; bis[4-(4-methyl-3-pentenyl)-3-cyclohexenyl] sulfone; bis[4-vinyl-3-cyclohexenyl] sulfone; bis[4-(3-hexenyl)-3-cyclohexenyl] sulfone; 3-(4-methyl-3-pentenyl-3-cyclohexenyl bicyclo[2.2.1]-5-hepten-2-yl sulfone; 4-vinyl-3-cyclohexenyl bicyclo[2.2.1]-5-hepten-2-yl sulfone; 3-cyclohexenyl 6-(3-butenyl)-bicyclo[2.2.1]-5-hepten-2-yl sulfone; and the like.

A further embodiment of this invention is directed to a novel and useful subclass of bis(bicyclo[2.2.1]-5-hepten-2-yl) sulfones which may be represented by the following general formula:

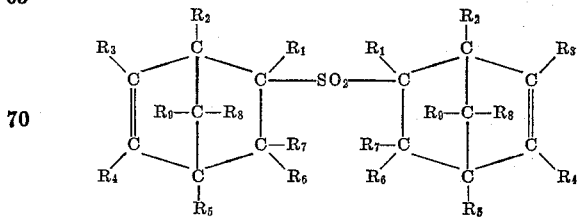

wherein $R_1$ through $R_9$ represents members selected from the group consisting of hydrogen, halogen, lower alkyl and lower alkenyl groups, the total number of carbon atoms in $R_1$ through $R_9$ does not exceed 12 carbon atoms.

Illustrative of the bis(bicycloheptenyl)sulfones falling within this subclass, there may be mentioned inter alia: bis(bicyclo[2.2.1]-5-hepten-2-yl) sulfone; bis(1-chlorobicyclo[2.2.1]-5-hepten-2-yl) sulfone; bis(1-bromobicyclo[2.2.1] - 5 - hepten - 2 - yl) sulfone; bis(3-chlorobicyclo[2.2.1] - 5 - hepten - 2 - yl) sulfone; bis(3-bromobicyclo[2.2.1]-5-hepten-2-yl) sulfone; bis(1,4,5,6,7,7-hexachlorobicyclo[2.2.1]-5-hepten-2-yl) sulfone; bis(5-(3-butenyl)-bicyclo[2.2.1]-5-hepten-2-yl) sulfone; bis(6-(4-hexenyl)-bicyclo[2.2.1]-5-hepten-2-yl) sulfone; bis(5-(2-propenyl)-bicyclo[2.2.1]-5-hepten-2-yl) sulfone; and the like.

The term "lower alkyl" group, as used in the specification and claims, is intended to mean saturated, unsubstituted hydrocarbon chains containing from one through six carbon atoms per chain. Typical lower alkyl groups include methyl, ethyl, propyl, isopropyl, butyl, isobutyl, tertiary butyl, amyl and hexyl, and the like.

The term "lower alkenyl" groups, as used in the specification and claims, is intended to mean unsaturated, unsubstituted hydrocarbon chains containing from one through six carbon atoms per chain. Typical lower alkenyl groups include vinyl, allyl, 1-propenyl, 2-butenyl, 3-butenyl, 2-methyl-1-propenyl, 4-pentenyl, 5-hexenyl, and the like.

The following examples will serve to illustrate the practice of the invention:

EXAMPLE I

*Preparation of Bis(3-Cyclohexenyl) Sulfone*

Divinyl sulfone 236 grams (2 mols), butadiene 432 grams (8 mols), sulfuryl chloride 3 grams and beta-naphthylphenylamine 3 grams were mixed together at −50° C. and charged to a 3-liter Adkins bomb which was fitted only with a pressure gauge and blow-off line aside from the usual agitation equipment. The temperature in the bomb was raised to 144° C., with agitation, and the internal pressure was 400 p.s.i.g. Heating was continued for 6.5 hours at 140–145° C. and the internal pressure decreased to a constant 125 p.s.i.g.

The bomb was allowed to cool to room temperature and the excess butadiene was vented to the atmosphere. Solid product weighing 562 was then removed from the bomb and recrystallized twice from methanol to give 246 grams (54.5 percent yield) of bis(3-cyclohexenyl) sulfone, melting point, 139–140° C. *Analysis.*—Found: 63.3% C, 8.4% H, 12.96% S. Calculated for $C_{12}H_{18}O_2S$=63.7% C, 8.0% H, 14.1% S. The compound was structurally confirmed by infrared analysis.

EXAMPLE II

*Preparation of Bis(Methyl-3-Cyclohexenyl) Sulfone*

Divinyl sulfone 236 grams (2 mols), "blending naphtha" (containing approximately 50 percent of a mixture of isoprene and piperylene) 792 grams (about 6 mols of isoprene-piperylene mixture), sulfuryl chloride 3 grams, and betanaphthylphenylamine 3 grams were mixed together and reacted at 150–155° C. in an Adkins bomb as described in Example I. The product, a liquid weighing 972 grams, was stripped free of low-boiling materials in a short Claisen-type still to a final kettle temperature of 130° C. at 2 mm. pressure. The product was then distilled in the same apparatus to give 458 grams (90 percent yield based on the starting sulfone) of an isomeric mixture of bis(methyl-3-cyclohexenyl) sulfones boiling at 170–180° C. at 0.9 mm. Hg and having a refractive index of 1.5294, n 30/D. The product was confirmed by elemental and infrared spectrum analyses. Found: 66.9% C, 9.1% H, 12.6% S. Calculated for $C_{14}H_{22}O_2S$: 66.2%, C, 8.7% H, 12.6% S.

EXAMPLE III

*Preparation of Bis(Bicyclo[2.2.1]-5-Hepten-2-yl) Sulfone*

The equipment consisted of a 2-liter, 4-neck reaction flask which was fitted with a mechanical stirrer, thermometer, condenser and dropping funnel. Divinyl sulfone 170 grams (1.44 mols), benzene 300 grams and hydroquinone 0.2 gram were stirred together in the reaction flask while adding 208 grams (3.16 mols) of freshly distilled cyclopentadiene dropwise during about 1 hour and cooling the reaction mixture as required to control the temperature at 50–60° C. The stirring was continued for about an hour and the reaction product was allowed to stand overnight at room temperature. The reaction product was transferred to a one-liter boiling flask and stripped free of solvent in a short Claisen-type still to a final kettle temperature of 150° C. at 2 millimeters, Hg. The residual product was then distilled into two fractions: (1) boiling point, 135–150° C. at 0.5 millimeter Hg, 109 grams, n 30/D 1.5373; (2) boiling point, 150–165° C. at 0.5 millimeter Hg, 170 grams which crystallized on standing. A small sample of the purer fraction 2 was recrystallized from isopropyl ether and had a melting point of 89–92° C. Fraction 2 of the distillation was taken as the high purity product and was confirmed by elemental and infrared analyses. *Analysis.*—Found: 66.9% C; 7.5% H; 12.5% S. Calculated for $C_{14}H_{18}O_2S$: 67.2% C; 7.2% H; 12.8% S.

EXAMPLE IV

*Preparation of Bis(1,4,5,6,7,7-Hexachlorobicyclo[2.2.1]-5-Hepten-2-yl) Sulfone*

Using equipment similar to that described in Example 3, hexachlorocyclopentadiene, 546 grams (2.0 mols) and hydroquinone, 3 grams were stirred together in the reaction flask and heated to 70° C. Divinyl sulfone, 118 grams (1.0 mol), was fed dropwise to the flask while heating the reaction mixture at 70–90° C. The reaction product was further heated at 125–130° C. for 4 hours and then at 150° C. for 4 hours while stirring. The resulting product was transferred to a Claisen-type still and stripped of low boilers to final kettle temperature of 185° C. at 2 millimeters Hg pressure. All but 100 grams of the residue product was washed thoroughly with 50° C. methanol, cooled to 15° C. and collected on a Büchner funnel. There was obtained 186 grams of bis(1,4,5,6,7,7-hexachlorobicyclo[2.2.1]-5-hepten-2-yl) sulfone which had a melting point of 212° C. *Analysis.*—Found 5.92% S, 63.2% Cl. Calculated for $C_{14}H_6Cl_{12}O_2S$: 5.82% S, 64.15% Cl.

EXAMPLE V

*Preparation of Bicyclo[2.2.1]-5-Hepten-2-yl Vinyl Sulfone*

The same equipment was used as described in Example III. Divinyl sulfone, 708 grams (6 mols), benzene, 900 milliliters and hydroquinone, 1 gram were stirred together in the reaction flask and heated to 50° C. Cyclopentadiene, 132 grams (2 mols) was fed dropwise to the flask during about three hours. The reaction was exothermic and the temperature was controlled at 50–55° C. by intermittent cooling with a water bath. After the completion of the cyclopentadiene feed, the reaction product was stirred until the exothermic reaction subsided and then heated at 50° C. for three hours with stirring. The reaction product was charged to a Claisen-type still and fractionated to give recovered benzene, 413 grams of unreacted divinyl sulfone, 229 grams of bicyclo[2.2.1]-5-hepten-2-yl vinyl sulfone boiling at 131–135° C. at 2 millimeters Hg and having a refractive index of 1.5249, n 30/D, 119 grams of midfractions and 50 grams of residue.

*Analysis.*—Infrared showed strong terminal unsaturation bands present in the main product. Percent S found=17.76. Calculated for $C_9H_{12}O_2S$=17.38% S.

EXAMPLE VI

*Preparation of Bis[3- and/or 4-(4-Methyl-3-Pentenyl)-3-Cyclohexenyl] Sulfone*

The same equipment was used as described in Example III. Toluene, 200 grams, 7-methyl-3-methylene-1,6-octadiene, 2.5 mols (400 grams of a commercial product called "myrcene" and assayed as 85% pure), and hydroquinone, 3 grams were stirred in the flask and heated to 125° C. Then during the next 20 minutes, one mol (118 grams) of divinyl sulfone was fed dropwise to the flask. After a short induction period, the reaction became mildly exothermic and some cooling was required to keep the reaction temperature from rising above 125° C. After the addition of the divinyl sulfone, the temperature gradually subsided to 100° C. during the next 20 minutes. Heat was applied and the product was heated at 130–140° C. for two hours. The product was charged to a Claisen-type still and stripped free of solvent under reduced pressure. The kettle residue was diluted with 200 grams of isopropyl ether, treated with activated carbon and then filtered to remove the color. The product was again charged to the Claisen still and stripped free of solvent to a final kettle temperature of 150° C. at 5 millimeters Hg. There was obtained 370 grams of amber colored residue product which was rather viscous when cooled to room temperature. *Analysis.*—Found 74.7% C, 10.2% H, 7.9% S. Calculated for $C_{24}H_{38}O_2S$: 73.8% C, 9.7% H, 8.2% S.

EXAMPLE VII

A mechanical mixture consisting of 64.5 parts by weight of poly-(vinyl chloride) having a reduced viscosity of 0.9, 34 parts of bis(bicyclo[2.2.1]-5-hepten-2-yl) sulfone and 1.5 parts of VanStay HT (a barium/cadmium salt used as a heat stabilizer for vinyl halide resins) was fluxed into a sheet by milling for five minutes at 135° C. to 158° C. on a steam-heated, two-roll mill. Strips from the 30-mil sheet were compression molded for ten minutes at 145° C. and 500 pounds per square inch, to obtain a 0.25 inch by 0.5 inch by 0.5 inch bar which was subsequently subjected to a heat-distortion test in accordance with an accepted testing method (American Society of Testing Materials method D648–45T). The following data show that the sulfone compound plasticizes the poly (vinyl chloride), as evidenced by a sharp reduction in heat-distortion point when the sulfone compound is present:

| | A | B |
|---|---|---|
| Poly(vinyl chloride) of 0.9 reduced, viscosity, parts | 64.5 | 98.5 |
| Bis(bicyclo[2.2.1]-5-hepten-2-yl) sulfone, parts | 34.0 | |
| VanStay HT, parts | 1.5 | 1.5 |
| Heat distortion, °C | 39 | 72 |

What is claimed is:

1. Cycloalkenyl sulfones selected from a member of a class consisting of bis(lower alkenyl-substituted cyclohexenyl) sulfone and bicycloheptenyl sulfones represented by the general formula:

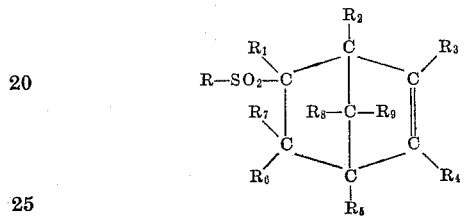

wherein R represents a member selected from the class consisting of an alkenyl radical containing from 2 to 18 carbon atoms, cyclohexenyl, bicycloheptenyl, and halogenated bicycloheptenyl radicals; and wherein $R_1$ through $R_9$ represent a member selected from the group consisting of hydrogen, halogen, lower alkyl, and lower alkenyl radicals.

2. Bis(bicyclo[2.2.1]-5-hepten-2-yl) sulfone.
3. Bis(1,4,5,6,7,7-hexachlorobicyclo[2.2.1]-5-hepten-2-yl) sulfone.
4. Bicyclo[2.2.1]-5-hepten-2-yl vinyl sulfone.
5. Bis[3-(4-methyl-3-pentenyl)-3-cyclohexenyl] sulfone.
6. Bis[4-(4-methyl-3-pentenyl)-3-cyclohexenyl] sulfone.

References Cited in the file of this patent
UNITED STATES PATENTS
2,870,163    Davis et al. _____ Jan. 20, 1959